US012537810B2

(12) United States Patent
Ohashi

(10) Patent No.: US 12,537,810 B2
(45) Date of Patent: Jan. 27, 2026

(54) MONITORING APPARATUS, CONTROL METHOD THEREOF, STORAGE MEDIUM, AND IMAGE PROCESSING APPARATUS

(71) Applicant: CANON KABUSHIKI KAISHA, Tokyo (JP)

(72) Inventor: Toshio Ohashi, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 367 days.

(21) Appl. No.: 17/697,395

(22) Filed: Mar. 17, 2022

(65) Prior Publication Data
US 2022/0311760 A1 Sep. 29, 2022

(30) Foreign Application Priority Data
Mar. 23, 2021 (JP) ................. 2021-049150

(51) Int. Cl.
G06F 7/04 (2006.01)
H04L 9/40 (2022.01)

(52) U.S. Cl.
CPC ...... H04L 63/0823 (2013.01); H04L 63/0876 (2013.01); H04L 63/20 (2013.01)

(58) Field of Classification Search
CPC ........ G06F 21/33; G06F 21/335; G06F 21/50; H04L 9/3268; H04L 63/0823; H04L 63/0876; H04L 63/20
See application file for complete search history.

(56) References Cited

U.S. PATENT DOCUMENTS

| 9,374,229 | B1* | 6/2016 | Schwengler ........ H04L 63/0823 |
| 12,002,055 | B1* | 6/2024 | Miller ................ G06Q 20/4016 |
| 12,132,722 | B1* | 10/2024 | Cignetti ................ H04L 63/108 |
| 2005/0071630 | A1* | 3/2005 | Thornton .............. H04L 9/3226 713/156 |
| 2007/0150727 | A1* | 6/2007 | Miyazawa ............ G06F 21/606 713/158 |
| 2009/0299972 | A1* | 12/2009 | Merchant ............ H04L 63/0823 707/E17.135 |
| 2012/0023560 | A1* | 1/2012 | Yanagi .................. G06F 21/645 726/6 |

(Continued)

FOREIGN PATENT DOCUMENTS

| JP | 2006-239930 A | 9/2006 |
| JP | 2007-504723 A | 3/2007 |

(Continued)

OTHER PUBLICATIONS

Morogan et al, Certificate Management in Ad Hoc Networks, Jan. 31, 2003, IEEE, pp. 1-5. (Year: 2003).*

(Continued)

*Primary Examiner* — Gary S Gracia
*Assistant Examiner* — Jenise E Jackson
(74) *Attorney, Agent, or Firm* — Carter, DeLuca & Farrell LLP

(57) ABSTRACT

The present monitoring apparatus is capable of communicating with one or more network devices via a network and verifies content information of a certificate related to security set in a network device to be monitored. The present monitoring apparatus also verifies update setting information related to a certificate update and provides a report based on two verification results.

10 Claims, 12 Drawing Sheets

(56) References Cited

U.S. PATENT DOCUMENTS

| | | | | |
|---|---|---|---|---|
| 2013/0173914 A1* | 7/2013 | Falk | ...................... | H04L 9/3268 |
| | | | | 713/156 |
| 2013/0332987 A1* | 12/2013 | Tenneti | ................... | H04L 63/10 |
| | | | | 726/4 |
| 2016/0337341 A1* | 11/2016 | Purusothaman | ........ | H04L 63/20 |
| 2017/0060936 A1* | 3/2017 | Gammans | ............ | G06F 16/2358 |
| 2018/0013766 A1* | 1/2018 | Ichihara | ................ | H04L 63/126 |
| 2019/0213317 A1* | 7/2019 | Fujikawa | ............ | H04L 63/0823 |
| 2019/0260595 A1* | 8/2019 | Walton | .................. | H04L 9/3268 |
| 2020/0021575 A1 | 1/2020 | Rezvani | | |

FOREIGN PATENT DOCUMENTS

| | | | |
|---|---|---|---|
| JP | 2008-009924 A | 1/2008 |
| JP | 2010-251945 A | 11/2010 |
| JP | 2013-062650 A | 4/2013 |
| JP | 2015-095053 A | 5/2015 |
| JP | 2018-133785 A | 8/2018 |
| JP | 2019-202502 A | 11/2019 |
| JP | 2020-004006 A | 1/2020 |

OTHER PUBLICATIONS

Suomalainen et al, OpenHouse: A Secure Platform for Distributed Home Services, Oct. 3, 2008, IEEE, pp. 15-23. (Year: 2008).*
Notice of Reasons for Refusal issued by the Japanese Patent Office on Oct. 6, 2024 in corresponding JP Patent Application No. 2021-049150, with English translation.

* cited by examiner

FIG. 3A

NETWORK DEVICE MANAGEMENT TABLE 300

| Device ID | Name | Vender | Model Name | IP Address | Serial No. | Last Updated |
|---|---|---|---|---|---|---|
| 1 | Device 1 | A | Model A | 192.168.XX.XX | XXXXXXXX | 2020/11/25 0:00 |
| 2 | Device 2 | B | Model B | 192.168.XX.XX | XXXXXXXX | 2020/11/25 0:00 |
| 3 | Device 3 | C | Model C | 192.168.XX.XX | XXXXXXXX | 2020/11/25 0:00 |

FIG. 3B

CERTIFICATE MANAGEMENT TABLE 301

| Cert ID | Device ID | Key name | Signature Algorithm | Key Length | Validity Start Date | Validity End Date | Country /Region | State | City | Organization | Organization Unit | Common Name |
|---|---|---|---|---|---|---|---|---|---|---|---|---|
| 1 | 1 | Key1 | SHA384 | RSA1024 | 2020/12/1 | 2021/2/1 | Japan | Kanagawa | Yokohama | Org1 | Dept1 | Name1 |
| 2 | 2 | Key2 | SHA512 | RSA1024 | 2020/12/1 | 2021/2/1 | Japan | Kanagawa | Yokohama | Org1 | Dept1 | Name2 |
| 3 | 3 | Key3 | SHA512 | RSA1024 | 2020/12/1 | 2021/2/1 | Japan | Kanagawa | Yokohama | Org1 | Dept1 | Name3 |

FIG. 3C

SETTING MANAGEMENT TABLE 302

| Setting ID | Device ID | SCEP Server URL | Port number | Key name | Signature Algorithm | Key Length | Country /Region |
|---|---|---|---|---|---|---|---|
| 1 | 1 | http://192.168.xxx.xxx/scep/ | 80 | Key1 | SHA384 | RSA1024 | Japan |
| 1 | 2 | http://192.168.xxx.xxx/scep/ | 80 | Key2 | SHA512 | RSA1024 | Japan |
| 1 | 3 | http://192.168.xxx.xxx/scep/ | 80 | Key3 | SHA512 | RSA1024 | Japan |

| State | City | Organization | Organization Unit | Common Name | Challenge password | Execution date time | Usage |
|---|---|---|---|---|---|---|---|
| Kanagawa | Yokohama | Org1 | Dept1 | Name1 | XXXXX | 2020/1/25 0:00 | TLS |
| Kanagawa | Yokohama | Org1 | Dept1 | Name2 | XXXXX | 2020/1/25 0:00 | IPSec |
| Kanagawa | Yokohama | Org1 | Dept1 | Name3 | XXXXX | 2020/1/25 0:00 | IEEE802.1x |

FIG. 3D

SECURITY MONITORING POLICY SETTING MANAGEMENT TABLE — 303

| Policy ID | Device ID | Interval (days) | Next execution date time | TargetCertUsages | Cert PolicyID | CertAutoEnrollment PolicyID |
|---|---|---|---|---|---|---|
| 1 | 1 | 3 | 2021/1/25 0:00 | None,TLS,IEEE802.1x,IPSec | 1 | 1 |
| 1 | 2 | 3 | 2021/1/25 0:00 | None,TLS,IEEE802.1x,IPSec | 1 | 1 |
| 1 | 3 | 3 | 2021/1/25 0:00 | None,TLS,IEEE802.1x,IPSec | 1 | 1 |

FIG. 3E

CERTIFICATE MONITORING POLICY SETTING MANAGEMENT TABLE — 304

| CertPolicy ID | Remaining Days - Passed | Remaining Days - Low risk | Remaining Days - Medium risk | Remaining Days - High risk |
|---|---|---|---|---|
| 1 | 90 | 60 | 30 | 0 |
| 2 | 120 | 90 | 60 | 10 |
| 3 | 150 | 120 | 100 | 30 |

FIG. 3F

CERTIFICATE UPDATE SETTING MONITORING POLICY SETTING MANAGEMENT TABLE — 305

| CertAutoEnrollment PolicyID | Validity Check | SubjectField Check |
|---|---|---|
| 1 | TRUE | TRUE |
| 2 | TRUE | TRUE |
| 3 | TRUE | TRUE |

FIG. 5

```
SECURITY MONITORING POLICY SETTING SCREEN
[←][→] http://localhost/appServer/SecurityPolicyManagement.aspx       [⟳][✕]
FILE(F)  EDIT(E)  DISPLAY(V)  FAVORITES(A)  TOOLS(T)  HELP(H)

SECURITY MONITORING POLICY SETTING SCREEN

SECURITY MONITORING POLICY SETTING - CERTIFICATE
  PLEASE SET SECURITY MONITORING POLICY
  FOR CERTIFICATE OF PRINTER.                                   ⟋500
     ┌─ USAGE DESTINATION OF KEY TO BE MONITORED ──⟋501─┐
     │ ☑ NO USAGE                                       │
     │ ☑ TLS                                            │
     │ ☑ IEEE802.1x                                     │
     │ ☑ IPSec                                          │
     └──────────────────────────────────────────────────┘
        MONITORING POLICY FOR CERTIFICATE            ⟋502
     ┌─ CURRENTLY INSTALLED ON PRINTER ─────────────────┐
     │ ☑ CHECK CERTIFICATE VALIDITY PERIOD              │
     │      Passed :VALIDITY [ 90 ]  OR MORE DAYS       │
     │    Low Risk :VALIDITY [ 60 ]  OR MORE DAYS       │
     │ Medium Risk :VALIDITY [ 30 ]  OR MORE DAYS       │
     │   High Risk :VALIDITY [  0 ]  OR MORE DAYS       │
     └──────────────────────────────────────────────────┘
     ┌─ MONITORING POLICY FOR CERTIFICATE UPDATE SETTING ⟋503 ┐
     │                                                  │
     │ ☑ CHECK WHETHER AUTOMATIC CERTIFICATE UPDATE IS SET
     │   SUCH THAT EXPIRATION OF VALIDITY PERIOD DOES NOT OCCUR
     │                                                  │
     │ ☑ CHECK WHETHER SUBJECT INFORMATION SET IN AUTOMATIC
     │   CERTIFICATE UPDATE IS SAME AS SUBJECT INFORMATION OF
     │   CURRENTLY INSTALLED CERTIFICATE                │
     └──────────────────────────────────────────────────┘
                                          ⟋504      ⟋505
                                        [REGISTER] [CANCEL]
PAGE IS DISPLAYED
```

FIG. 6

```
SECURITY MONITORING POLICY SETTING SCREEN
← →  http://localhost/appServer/SecurityRiskReport.aspx
FILE(F)  EDIT(E)  DISPLAY(V)  FAVORITES(A)  TOOLS(T)  HELP(H)
SECURITY RISK WARNING REPORT SCREEN
SECURITY RISK WARNING REPORT
```

| GENERAL | CERTIFICATE | 600 |

601

CERTIFICATE SECURITY RISK

High Risk: 2 devices
Medium Risk: 5 devices
Low Risk: 1 devices
Total 33 devices
Passed: 25 devices ▱ Passed
▨ Low Risk
▥ Medium Risk
▧ High Risk

602

| Name | Vender | Model | IP address | Serial No. | Assessment Status | Last updated |
|---|---|---|---|---|---|---|
| ⊟ Device 1 | A | Model A | 192.168.xx.xx | XXXXXXXX | ⓥ Passed | 2020/11/25 0:00 |
| ⊟ Key 1 | | | | | | |
| ⓥ Validity End Date : 2021/2/1 (It will expire in 35 days but it will be replaced on 2021/1/25) | | | | | | |
| ⊞ Device 2 | B | Model B | 192.168.xx.xx | XXXXXXXX | ⓧ High Risk | 2020/11/25 0:00 |
| ⊟ Device 3 | C | Model C | 192.168.xx.xx | XXXXXXXX | ⓧ Medium Risk | 2020/11/25 0:00 |
| ⊟ Key 3 | | | | | | |
| ⓧ Validity End Date : 2021/2/1 (It will expire in 35 days) | | | | | | |

603  [ OK ]

PAGE IS DISPLAYED

F I G. 8

CERTIFICATE UPDATE HISTORY MANAGEMENT TABLE

| Log ID | Device ID | Execution date time | Result |
|---|---|---|---|
| 1 | 1 | 2020/2/1 0:00 | OK |
| 2 | 1 | 2020/8/1 0:00 | Network error |
| 3 | 1 | 2020/8/3 0:00 | OK |

~800

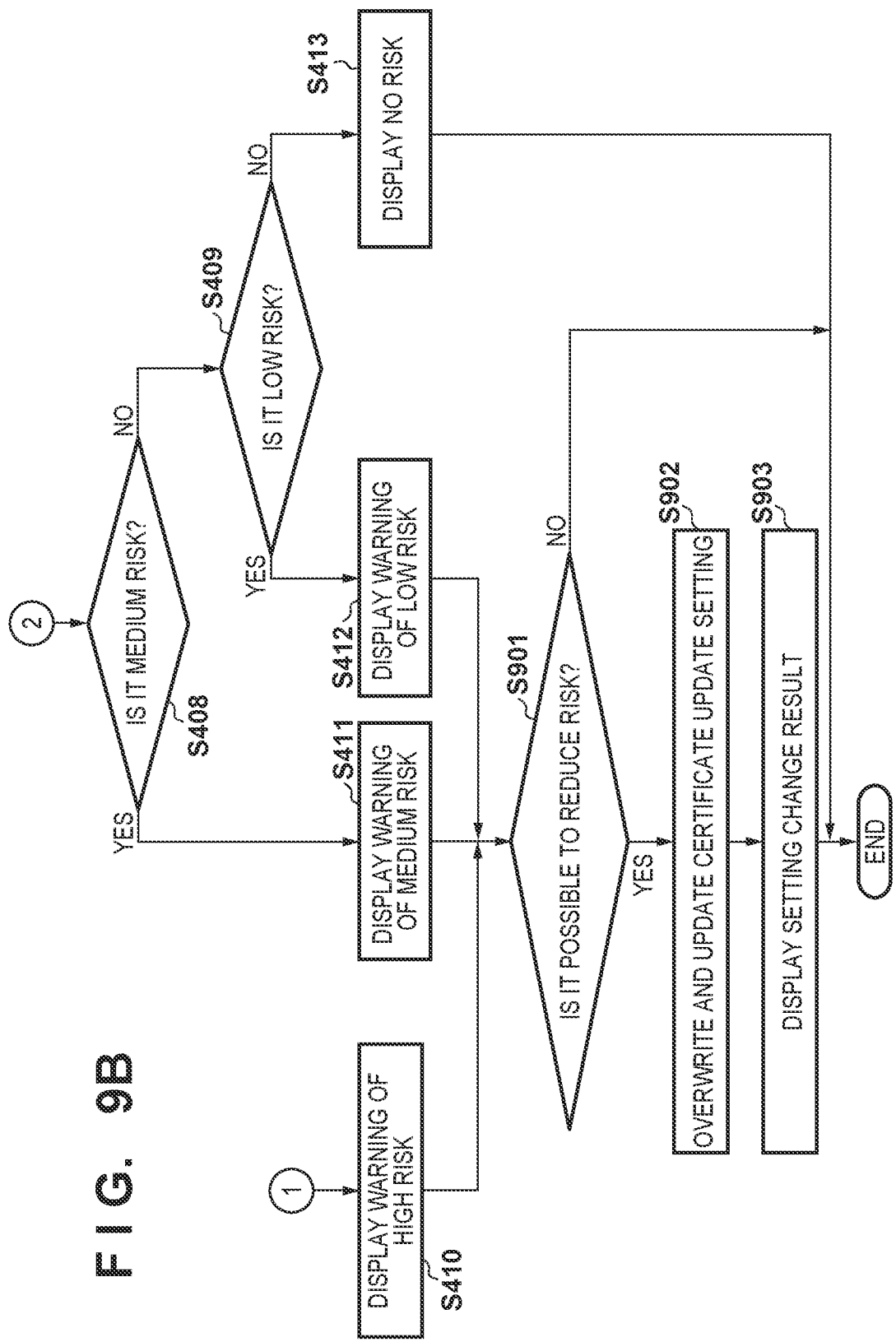

MONITORING APPARATUS, CONTROL METHOD THEREOF, STORAGE MEDIUM, AND IMAGE PROCESSING APPARATUS

BACKGROUND OF THE INVENTION

Field of the Invention

The present invention relates to a monitoring apparatus, a control method thereof, a storage medium, and an image processing apparatus.

Description of the Related Art

In recent years, with increased demand for security, the number of network devices in which security functions, such as TLS/SSL communication and IPSec, can be used by registering certificates has increased. In order to use the security functions of network devices, it is important to correctly register and use appropriate certificates. Japanese Patent Laid-Open No. 2006-239930 proposes a technique verifying content—such as a common name and a validity period, for example—of a certificate registered in a network device and giving a warning when a problem occurs at the time of monitoring the security of the network device.

However, in the above prior art, there is the following problem. A certificate registered in a network device has a validity period. Therefore, in the above prior art, in order to guarantee the security of a network device, it is necessary to issue a new certificate before the validity period of a certificate expires and update the certificate registered in the network device. Therefore, in order to monitor the security of a network device, it is necessary to not only verify whether a certificate itself has no problem but also verify whether a schedule to appropriately update the certificate without security risk, such as expiration of the validity period, has been made.

SUMMARY OF THE INVENTION

The present invention enables realization of not only verifying the content of a certificate registered in a network device but also appropriately providing a result of monitoring security from many aspects in order to guarantee the security of the network device.

One aspect of the present invention provides a monitoring apparatus capable of communicating with one or more network devices via a network, the apparatus comprising: at least one memory device that stores a set of instructions; and at least one processor that executes the set of instructions to: verify content information of a certificate related to security set in a network device to be monitored; verify update setting information related to an update of the certificate; and provide a report based on each verification result.

Another aspect of the present invention provides a method of controlling a monitoring apparatus capable of communicating with one or more network devices via a network, the method comprising: verifying content information of a certificate related to security set in a network device to be monitored; verifying update setting information related to an update of the certificate; and providing a report based on each verification result.

Still another aspect of the present invention provides a non-transitory computer-readable storage medium storing a program that causes a computer to execute a method of controlling a monitoring apparatus capable of communicating with one or more network devices via a network, the method comprising: verifying content information of a certificate related to security set in a network device to be monitored via the network; verifying update setting information related to an update of the certificate; and providing a report based on each verification result.

Yet still another aspect of the present invention provides an image processing apparatus, comprising: the monitoring apparatus, a request unit that requests a certificate issuing server to issue a certificate and acquires the certificate; and an image processing unit.

Further features of the present invention will become apparent from the following description of exemplary embodiments (with reference to the attached drawings).

BRIEF DESCRIPTION OF THE DRAWINGS

FIGS. 3A-3F are a diagram illustrating a database configuration according to the embodiment.

FIG. 5 is a diagram illustrating an example of a screen for setting a monitoring policy related to security according to the embodiment.

FIG. 6 is a diagram illustrating an example of a security risk warning report screen according to the embodiment.

FIG. 8 is a diagram illustrating a database configuration according to the embodiment.

FIGS. 9A-9B are a flowchart for when determining security risk and executing a warning display according to the embodiment.

DESCRIPTION OF THE EMBODIMENTS

Figure 1:
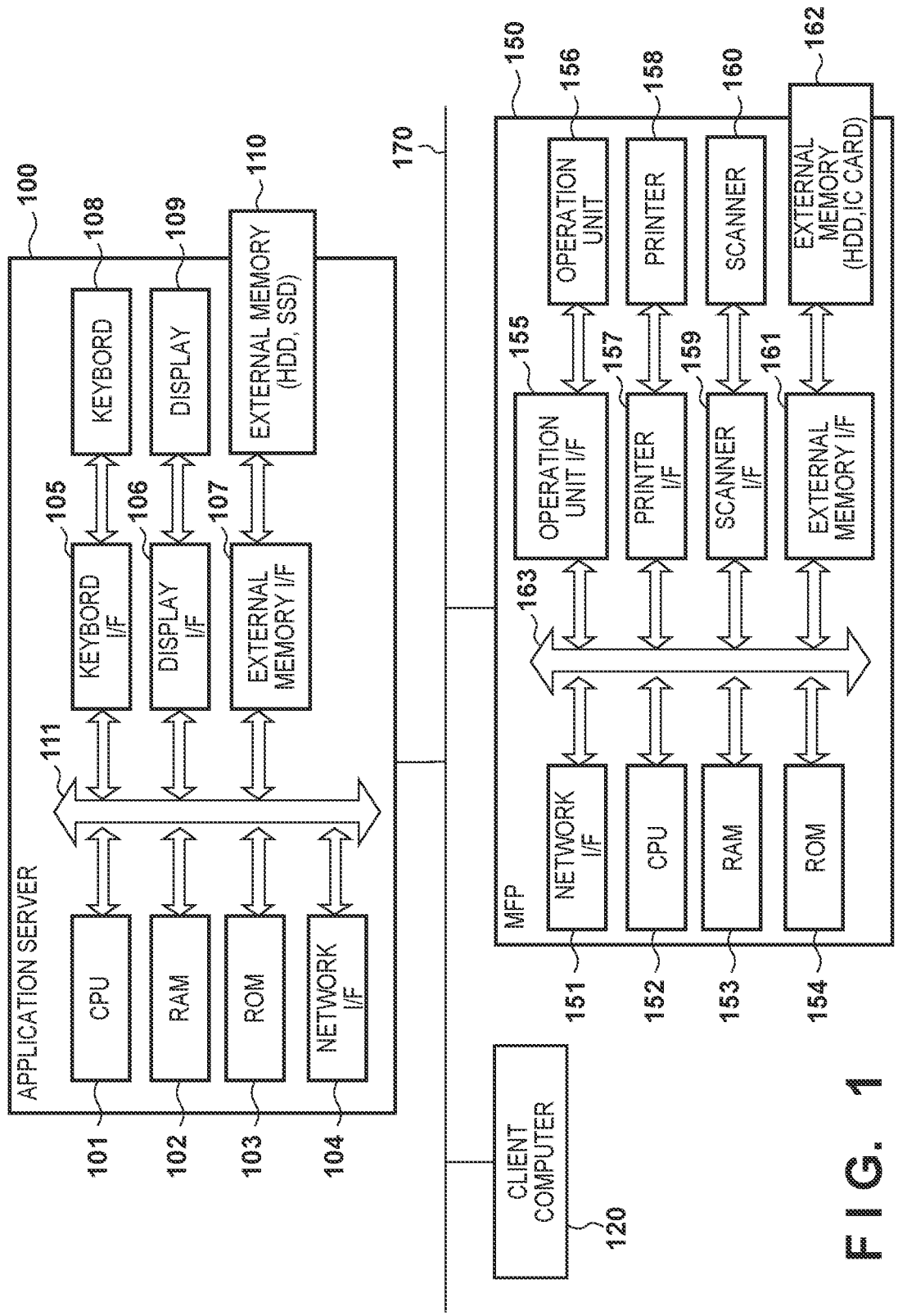
FIG. 1 is a diagram illustrating a system configuration and a hardware configuration according to an embodiment.

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate.

Furthermore, in the attached drawings, the same reference numerals are given to the same or similar configurations, and redundant description thereof is omitted.

First Embodiment

<Overall Configuration of System>

Hereinafter, a first embodiment of the present invention will be described. First, examples of a system configuration and a hardware configuration of a network device management system according to the present embodiment will be described with reference to FIG. 1. Here, description will be given using an application server as an example of a network device management apparatus according to the present embodiment. Further, in the present embodiment, description will be given using an MFP (Multifunction Peripheral, multifunction device), which is an image processing apparatus, as an example of the network device to be managed by the management apparatus. Note that the network device includes devices other than an MFP, such as a printer and a fax machine. Since a hardware configuration of a client computer 120 is the same as that of an application server 100 to be described below, description thereof will be omitted.

The network device management system is configured to include the application server 100, the client computer 120, and an MFP 150, which are connected by a network 170. The application server 100 and the client computer 120 have a configuration of a general-purpose computer. The configuration of a general-purpose computer for implementing the application server 100 may be implemented using hardware resources supplied on demand by virtualization technology.

The application server 100 includes a CPU 101, a RAM 102, a ROM 103, a network I/F 104, a keyboard I/F 105, a display I/F 106, and an external memory I/F 107. The application server 100 further includes a keyboard 108, a display 109, and an external memory 110. A reference numeral 111 is a system bus, which connects the devices.

The CPU 101 executes processing based on an application program and the like stored in the ROM 103 or the external memory 110. In addition, the CPU 101 collectively controls the devices connected to the system bus 111. The CPU 101 also opens various registered windows based on commands instructed by a mouse cursor (not illustrated) and the like on the display 109 and performs various data processing. The RAM 102 functions as a main memory, work area, and the like of the CPU 101. The ROM 103 is a read-only memory that functions as a storage area of a basic I/O program and the like. The ROM 103 or the external memory 110 stores a program and the like of an operating system (hereinafter, referred to as OS), which is a control program of the CPU 101. Further, the ROM 103 or the external memory 110 stores files and various other data to be used for when performing processing based on the above application program and the like.

The network I/F 104 connects to the network 170 and performs network communication. The keyboard I/F 105 controls input from the keyboard 108 and a pointing device (not illustrated). The display I/F 106 controls display of the display 109. The external memory I/F 107 controls access to the external memory 110 such as a hard disk drive (HDD) and a solid state drive (SSD). The external memory 110 stores a boot program, various applications, user files, editing files, and the like.

The application server 100 operates in a state in which the CPU 101 is executing the basic I/O program and the OS written to the ROM 103 or the external memory 110. The basic I/O program is written to the ROM 103, and the OS is written to the ROM 103 or the external memory 110. When the computer is powered on, the OS is written to the RAM 102 from the ROM 103 or the external memory 110 by an initial program loading function in the basic I/O program, and the operation of the OS is started. Hardware resources such as the CPU 101, the ROM 103, and the external memory 110 comprising the application server 100 may be supplied on demand by virtualization technology. By providing these hardware resources on demand by virtualization technology, the application server 100 is configured as a virtual server on a cloud computing environment.

The MFP 150 includes a network I/F 151, a CPU 152, a RAM 153, a ROM 154, an operation unit I/F 155, a printer I/F 157, a scanner I/F 159, and an external memory I/F 161. The MFP 150 further comprises an operation unit 156, a printer 158, a scanner 160, and an external memory 162. A reference numeral 163 is a system bus, which connects the devices.

The network I/F 151 connects to the network 170 and performs network communication. The CPU 152 outputs an image signal as output information to the printer 158 via the printer I/F 157 connected to the system bus 163 based on a control program and the like. The control program is stored in the ROM 154, the external memory 162, or the like. The CPU 152 is capable of processing communication with a computer via the network I/F 151 and is configured to be capable of notifying the application server 100 of information and the like in the MFP 150. Further, the CPU 152 executes processing based on an application program and the like stored in the ROM 154 or the external memory 162. The RAM 153 functions as a main memory, a work area, and the like of the CPU 152 and is configured to be capable of expanding memory capacity by an optional RAM to be connected to an expansion port (not illustrated). Note that the RAM 153 is used as an output information expansion area, an environment data storage area, an NVRAM, and the like. The ROM 154 or the external memory 162 such as a hard disk drive (HDD) stores the control program of the CPU 152, application programs, font data used for when generating the above output information, information used on the MFP 150, and the like.

The operation unit I/F 155 controls an interface to and from the operation unit 156 and outputs, to the operation unit 156, image data to be displayed. The operation unit I/F 155 also receives information that a user has inputted via the operation unit 156. The operation unit 156 corresponds to an operation panel and the like on which switches, an LED display device, and the like for operation are disposed. The printer I/F 157 outputs an image signal as output information to the printer 158 (printer engine). The scanner I/F 159 receives an image signal as input information from the scanner 160 (scanner engine). The external memory I/F (memory controller) 161 controls access to the external memory 162 such as a hard disk drive (HDD) and an IC card. In addition, the above external memory is not limited to one, and configuration may be such that one or more external memories are provided and a plurality of external memories can be connected. Further, configuration may be such that an NVRAM (not illustrated) is included and stores printer mode setting information from the operation unit 156.

<Software Configuration>

Figure 2:
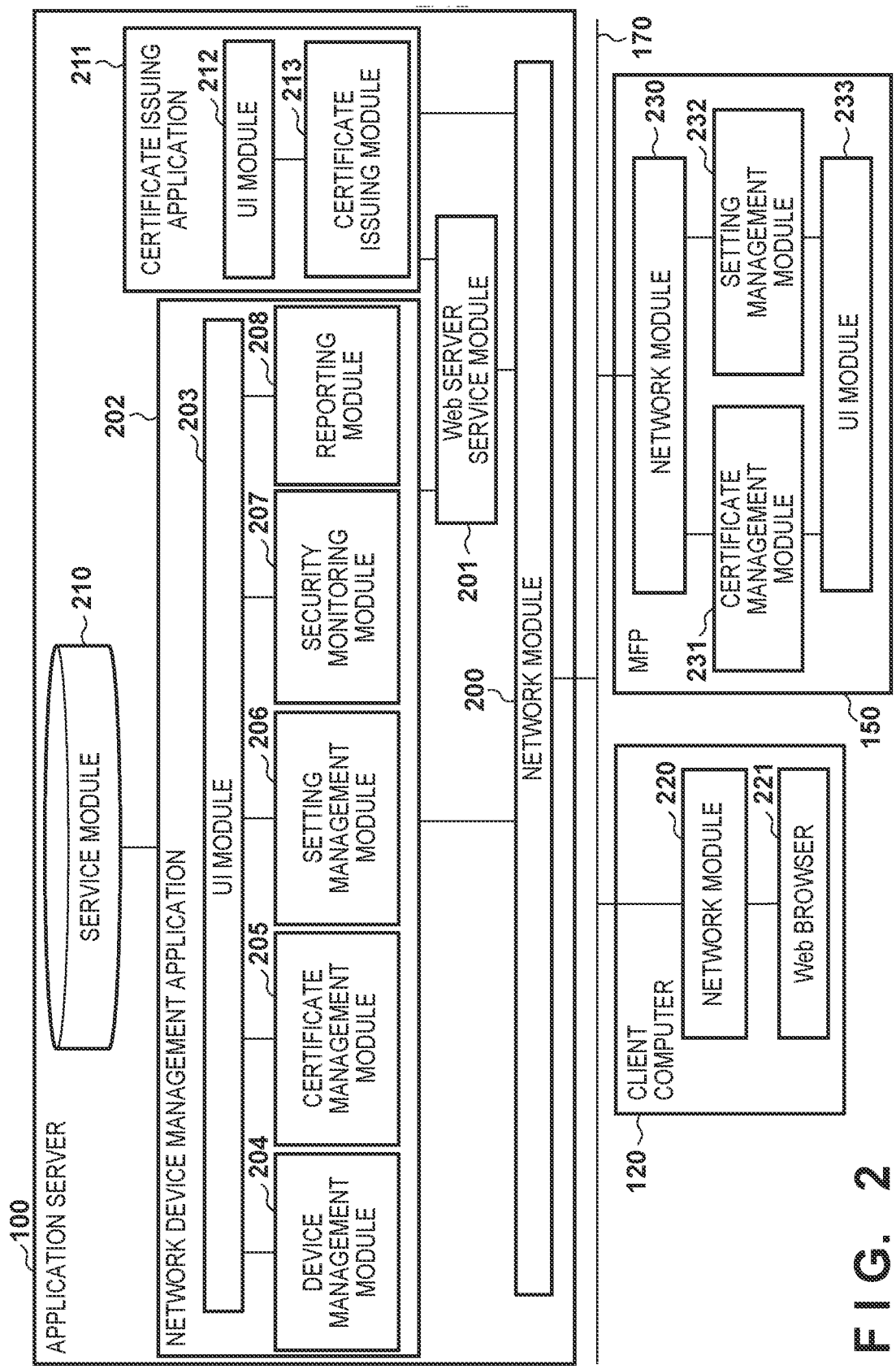
FIG. 2 is a diagram illustrating a software configuration according to the embodiment.

Next, a software configuration of the network device management system which includes the application server 100 which is the management apparatus according to the present embodiment will be described with reference to FIG. 2.

First, a software configuration of the application server 100 will be described. The application server 100 includes a network module 200, a Web server service module 201, a network device management application 202, a database server service module 210, and a certificate issuing application 211. The network device management application 202, the certificate issuing application 211, and each module are present as files stored in the external memory 110. These are program modules that, at the time of execution, are loaded and executed in the RAM 102 by the OS or a module that uses these modules. The network device management application 202 and the certificate issuing application 211 can be added to a CD-ROM (not illustrated) of the external memory 110 or, via the network 170, to an HDD or an SSD of the external memory 110. Here, the external memory 110 may be supplied on demand by virtualization technology on a cloud computing environment.

The network module 200 performs network communication with the client computer 120 and the MFP 150 using any communication protocol. The Web server service module 201 provides a service that returns an HTTP response upon receiving an HTTP request from a Web browser 221 of the client computer 120. As an example of an HTTP response to be returned, Web page data stored in the external memory 110 may be returned. Alternatively, the Web server service module 201 may request that a UI module 203 of the network device management application 202 generate an HTTP response.

The network device management application 202 is an application that manages the MFP 150 connected to the application server 100 via the network 170. The network device management application 202 is implemented as a program that executes processing in response to a request to a Web page provided by the Web server service module 201, for example. As described above, the network device management application 202 implements a Web application that manages the MFP 150 together with the Web server service module 201.

The network device management application 202 includes the UI module 203, a device management module 204, a certificate management module 205, a setting management module 206, a security monitoring module 207, and a reporting module 208. The UI module 203 generates an HTTP response in response to a request from the Web server service module 201. Further, the UI module 203 receives user input information transmitted from the Web browser 221 of the client computer 120 and invokes each module as necessary. Here, examples of modules to be invoked from the UI module 203 include the device management module 204, the certificate management module 205, the setting management module 206, the security monitoring module 207, and the reporting module 208. Of course, the UI module 203 may invoke other modules.

The device management module 204 acquires, via the network module 200, device information from the MFP 150 connected to the application server 100 via the network 170. Any communication protocol is used to acquire device information from the MFP 150. Examples of a communication protocol used by the device management module 204 include an SNMP (Simple Network Management Protocol) and the like. The device management module 204 stores the device information acquired from the MFP 150 in a network device management table 300 of a service module 210 to be described later and also retrieves the stored device information.

The certificate management module 205 manages certificate information registered in the MFP 150. The certificate management module 205 acquires, via the network module 200, certificate information registered in the MFP 150 from the MFP 150 connected to the application server 100 via the network 170. Any communication protocol is used to acquire certificate information from the MFP 150. Examples of a communication protocol used by the certificate management module 205 include a Web service and the like. Certificate information acquired from the MFP 150 includes, for example, a key name, a signature algorithm, a key algorithm, a key length/type, a validity period, a country/region name, a state, a city, an organization, an organization unit, a common name, a key usage destination, and the like. The certificate management module 205 stores certificate information in a certificate management table 301 of the service module 210 to be described later and retrieves the stored certificate information.

The setting management module 206 acquires, via the network module 200, setting information from the MFP 150 connected to the application server 100 via the network 170. Any communication protocol is used to acquire setting information from the MFP 150. Examples of a communication protocol used by the setting management module 206 include a Web service and the like. Examples of setting information acquired from the MFP 150 include certificate update setting information and the like. The setting management module 206 stores a setting in a setting management table 302 of the service module 210 to be described later and retrieves the stored setting. In the present embodiment, the setting management module 206 acquires setting information, which includes certificate update setting information, from the MFP 150 but may acquire setting information from outside the MFP 150. For example, if the network device management application 202 itself has setting information for the MFP 150, the setting management module 206 may acquire setting information from the network device management application 202 instead of the MFP 150.

The security monitoring module 207 manages security monitoring setting information and determines the security risk of the MFP 150 in accordance with the security monitoring setting information. The security monitoring module 207 stores a setting in a table of the service module 210 to be described later and retrieves the stored setting. Examples of tables to and from which settings are stored and retrieved include a setting management table 303 for monitoring policies related to security, a setting management table 304 for monitoring policies related to certificates, and a setting management table 305 for monitoring policies related to certificate update settings. For example, the security monitoring module 207 invoked from the UI module 203 stores security monitoring setting information inputted by the user in a table of the service module 210. The security monitoring module 207 also periodically acquires setting information of the monitoring policy related to security from a table of the service module 210 at arbitrary intervals. Together with that, the security monitoring module 207 acquires, via the certificate management module 205 and the setting management module 206, certificate information and setting information registered in the MFP 150. Then, the security monitoring module 207 determines the security risk of the MFP 150 in accordance with the acquired security monitoring setting information, certificate information, and setting information. In the present embodiment, an example in which the security monitoring module 207 determines security risk specific to security risk related to certificates will be described. However, there is no intent to limit the present invention, and risk may be determined using setting information unrelated to certificates when determining the security risk of the MFP 150. For example, the security risk that the security monitoring module 207 has determined with respect to certificates and the security risk that the security monitoring module 207 has determined with respect to setting information other than that may be used to determine the overall security risk of the MFP 150.

The reporting module 208 generates a report that visualizes, in a table, graph, or the like, the security risk that the security monitoring module 207 has determined and displays the report on a UI via the UI module 203. In the present embodiment, an example in which the reporting module 208 creates a report that visualizes security risk specific to security risk related to certificates will be described. However, there is no intent to limit the invention, and security risk associated with setting information unrelated to certificates may also be displayed. For example, the reporting module 208 may create a report that visualizes the overall security risk of the MFP 150 and individually visualize the security risk with respect to certificates as part of the report. In addition, instead of generating a screen for displaying a report as described in the present embodiment, the reporting module 208 may output, to an external device, data indicating content of a screen for displaying a warning report to be described later.

The service module 210 manages data and stores and retrieves data in accordance with requests from other modules. The service module 210 may be on a device separate from the application server 100 so long as it is accessible from the network device management application 202. The service module 210 may be a database service on a cloud computing environment. A detailed data structure of the database will be described later with reference to FIGS. 3A-3F.

The certificate issuing application 211 is an application that issues a certificate in response to a request from the MFP 150 connected by the network 170. The certificate issuing application 211 is implemented as a program that executes processing in response to a request to a Web page provided by the Web server service module 201, for example. As described above, the certificate issuing application 211 implements a Web application that issues a certificate to the MFP 150 together with the Web server service module 201. The certificate issuing application 211 may be on a device separate from the network device management application 202 so long as it is accessible from the MFP 150. The certificate issuing application 211 may be a certificate issuing service on a cloud computing environment. That is, the certificate issuing application 211 may be provided on a device external to the application server 100 such as a certificate issuing server.

The certificate issuing application 211 includes a UI module 212 and a certificate issuing module 213. The UI module 212 generates an HTTP response in response to a request from the Web server service module 201. Further, the UI module 212 receives user input information transmitted from the Web browser 221 of the client computer 120 and invokes each module as necessary. Here, an example of a module invoked from the UI module 212 includes the certificate issuing module 213. Of course, the UI module 212 may invoke other modules. The certificate issuing module 213 receives, via the network module 200, a certificate issuance request from the MFP 150 connected to the application server 100 via the network 170, issues a certificate, and returns the certificate to the MFP 150. In addition, the certificate issuing module 213 returns a certificate issuance status in response to a request from the UI module 212.

Next, a software configuration of the client computer 120 will be described. The client computer 120 includes a network module 220 and the Web browser 221. Each of the modules comprising the client computer 120 is a program module that is present as a file stored in the ROM 103 or the external memory 110. At the time of execution, these modules are loaded and executed in the RAM 102 by the OS or a module that uses these modules. The network module 220 performs network communication with the application server 100 and the MFP 150 using any communication protocol. The reference numeral 221 is a Web browser, which transmits an HTTP request message via the network module 220 and receives and displays an HTTP response message. Access from the client computer 120 to the application server 100 is performed via the Web browser 221.

Next, a software configuration of the MFP 150 will be described. The MFP 150 includes a network module 230, a certificate management module 231, a setting management module 232, and a UI module 233. The respective modules are present as files stored in the ROM 154 or the external memory 162 and, at the time of execution, are loaded and executed in the RAM 153. The network module 230 performs network communication with the application server 100 and the client computer 120 using any communication protocol. The certificate management module 231 manages a certificate registered in the MFP 150. The certificate management module 231 also returns the certificate information of a certificate registered in the MFP 150 via the network module 230 in response to a request from the application server 100. The certificate information returned here includes a key name, a signature algorithm, a key length, a validity period start date, a validity period end date, a country/region name, a state, a city, an organization, an organization unit, a common name, and the like, for example. The certificate management module 231 transmits a certificate issuance request to the certificate issuing application 211 of the application server 100 in accordance with a certificate update setting that the setting management module 232 to be described later manages. The certificate management module 231 receives a certificate that the certificate issuing application 211 of the application server 100 has issued and registers the certificate with the MFP 150. In addition, when registering a certificate with the MFP 150, the certificate management module 231 may remove an older key and a certificate whose usage destination is the same therewith. The setting management module 232 manages all the setting values of the MFP 150. The setting management module 232 also returns a setting value of the MFP 150 via the network module 230 in response to a request from the application server 100. The UI module 233 renders a UI displayed on the operation unit 156 of the MFP 150 and receives a user input value inputted by an UI operation of the user on the operation unit 156.

<Database>

Next, examples of table configurations in the service module 210 of the database will be described with reference to FIGS. 3A-3F. Note that the table configurations of FIGS. 3A-3F are merely examples, do not intend to limit the present invention, and, in the present invention, there may be different table configurations from the table configurations to be described below.

The reference numeral 300 is a network device management table and is a table for managing device information related to network devices that the network device management application 202 manages. Information managed in the network device management table 300 includes a device ID (network device identifier), a device name, a vendor name, a model name, an IP address, a serial number, a last update date/time, and the like, for example. A device ID is an identifier that uniquely identifies a network device such as the MFP 150. A last update date/time indicates the date/time at which the record was last updated with information acquired from a network device such as the MFP 150.

The reference numeral 301 is a certificate management table and is a table for managing information of certificates registered in network devices. Information managed in the certificate management table 301 includes a certificate ID, a device ID, a key name, a signature algorithm, a key length, a validity period start date, a validity period end date, a country/region name, a state, a city, an organization, an organization unit, a common name, and the like, for example. A certificate ID is an identifier that uniquely identifies a certificate. A key name and a key length indicate the name and the data length of an encryption key. A signature algorithm indicates an algorithm for when verifying a certificate. A validity period start date and a validity period end date are dates indicating the start and the end of the validity period of a certificate.

The reference numeral 302 is a setting management table and is a table for managing setting information acquired from network devices such as the MFP 150. Information managed in the setting management table 302 includes a setting ID, a device ID, certificate update setting information, certificate update date/time information, a key usage destination, and the like, for example. A setting ID is an identifier that uniquely identifies a setting. Certificate update setting information includes a SCEP server URL, a port number, a key name, a signature algorithm, a key length, a country/region name, a state, a city, an organization, an organization unit, a common name, a challenge password, and the like, for example. SCEP is an abbreviation of Simple Certificate Enrollment Protocol and is a protocol for registering certificates.

The reference numeral 303 is a setting management table for monitoring policies related to security and is a table for managing the settings of policies for monitoring the security of network devices. Information managed in the setting management table 303 is an ID of a policy related to security monitoring, a device ID, monitoring intervals, a next monitoring execution date/time, target key usage destination information, a certificate policy ID, an ID of a policy related to monitoring certificate update settings, and the like, for example. An ID of a policy related to security monitoring is an identifier that uniquely identifies a setting of a monitoring policy related to security. A certificate monitoring policy ID is an identifier that uniquely identifies a certificate monitoring policy. An ID of a policy for monitoring certificate update settings is an identifier that uniquely identifies a policy related to monitoring certificate update settings.

The reference numeral 304 is a setting management table for monitoring policies related to certificates and is a table for managing the settings of policies for monitoring the security of certificates registered with network devices. Information managed in the setting management table 304 is, for example, a certificate monitoring policy ID and a warning threshold related to a certificate validity period. A certificate monitoring policy ID is an identifier that uniquely identifies a certificate monitoring policy. Here, as an example of a warning threshold related to a certificate validity period, threshold information (threshold number of days), which indicates that there is "no problem" when the number of days remaining until the certificate validity period expires is a predetermined number or more, is stored. Furthermore, threshold information, which indicates whether to determine "Low risk" and "Medium risk" when the number of days is a predetermined number or more, and "High risk" when the number of days is a predetermined number or less, is stored.

The reference numeral 305 is a setting management table for monitoring policies related to certificate update settings and is a table for managing policy settings for monitoring the security of certificate update settings of network devices. The information managed in the setting management table 305 is, for example, an ID of a policy related to monitoring certificate update settings, a verification flag, a check flag related to setting content, and the like. An ID of a policy related to monitoring certificate update settings is an identifier that uniquely identifies a monitoring policy related to certificate update settings. A verification flag is flag information indicating whether or not to verify whether an update setting has been made such that a certificate registered in a network device is updated before the validity period of the certificate expires. A certificate update setting content check flag is flag information indicating whether or not to check whether the content of a certificate registered in a network device and the content set in a certificate update setting are the same. The content of a certificate to be checked here includes a key name, a signature algorithm, a key length, a country/region name, a state, a city, an organization, an organization unit, a common name, and the like, for example.

<Monitoring Flow>

Figure 4:
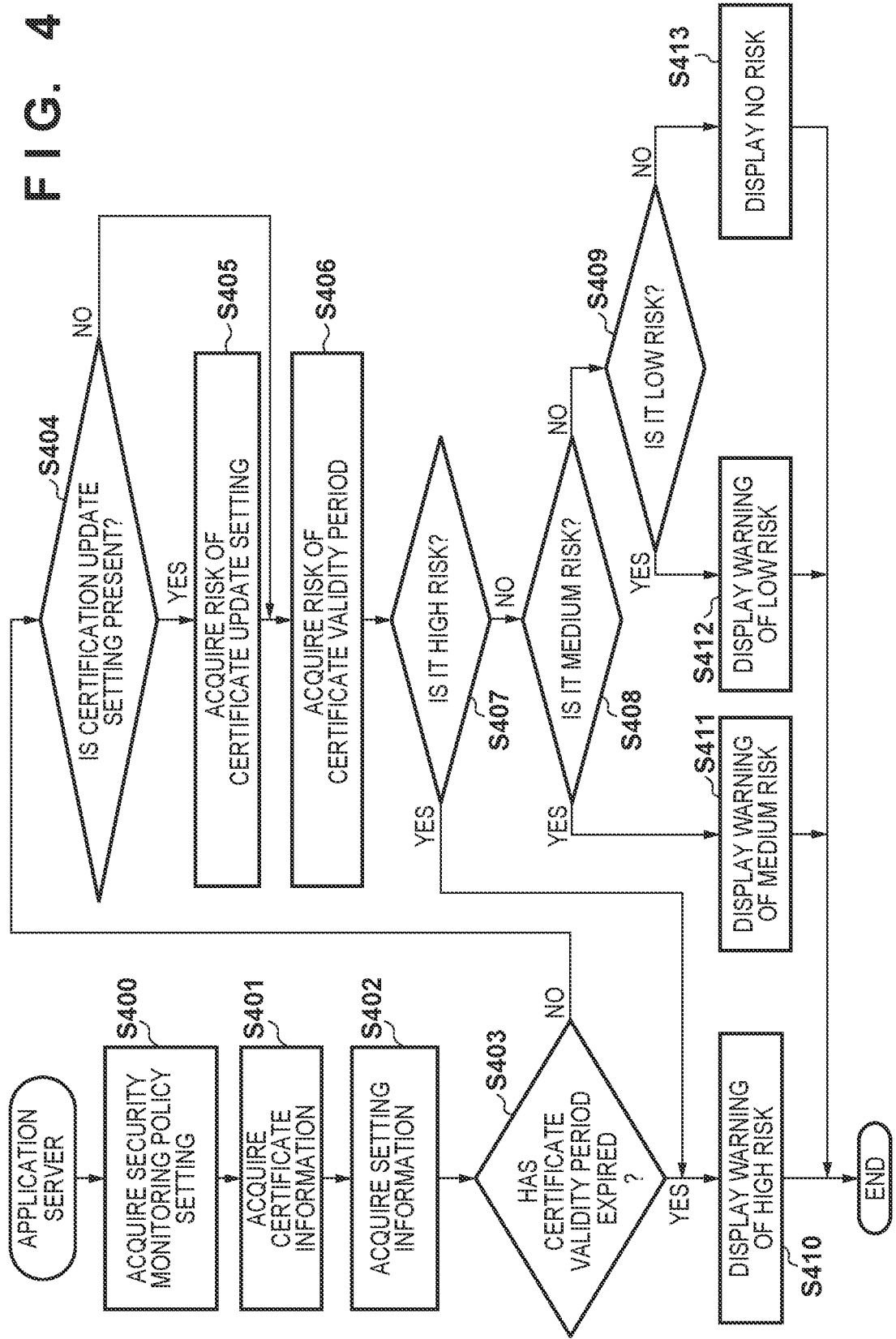
FIG. 4 is a flowchart for when determining security risk and executing a warning display according to the embodiment.

Next, a flow of processing of the application server 100 when the application server 100 monitors the security risk of the MFP 150 and gives a warning based on the monitoring result will be described with reference to FIG. 4. The processing described below is realized by, for example, the CPU 101 of the application server 100 reading a control program stored in a memory such as the ROM 103 into the RAM 102 and executing the control program.

In step S400, the security monitoring module 207 of the application server 100 acquires a setting of a monitoring policy related to security from a table of the service module 210. Here, as a table from which a setting of a monitoring policy related to security is to be acquired, there are the setting management table 303, the setting management table 304, and the setting management table 305 which are related to security, certificates, and update settings. A setting of a monitoring policy related to security to be acquired is a user input value previously inputted by the user via a setting input screen that the UI module 203 has stored in a table via the security monitoring module 207. Here, as a table to which a setting of a monitoring policy related to security is to be stored, there are the setting management table 303, the setting management table 304, and the setting management table 305 which are related to security, certificates, and update settings. A screen for inputting a setting of a monitoring policy related to security will be described later with reference to FIG. 5.

In step S401, the security monitoring module 207 acquires certificate information of the MFP 150 or the like via the certificate management module 205 of the application server 100. The certificate information to be acquired includes, as content information of a certificate, a key name, a signature algorithm, a key length, a validity period start date, a validity period end date, a country/region name, a state, a city, an organization, an organization unit, a common name, and the like, for example. Furthermore, in step S402, the security monitoring module 207 acquires setting information of the MFP 150 via the setting management module 206 of the application server 100. The setting information to be acquired includes, certificate update setting information, certificate update date/time information, a usage destination of a key, and the like, for example. Here, certificate update setting information includes an SCEP server URL, a port number, a key name, a signature algorithm, a key length, a country/region name, a state, a city, an organization, an organization unit, a common name, a challenge password, and the like, for example.

In step S403, the security monitoring module 207 serves as a first verification unit and determines whether or not the validity period of a certificate has expired based on the certificate information acquired from the MFP 150 in step S401. If it is determined that the validity period of the certificate has expired, the process proceeds to step S410; otherwise, the process proceeds to step S404. In step S404, the security monitoring module 207 determines whether a valid certificate update setting is present in the setting information based on the setting information acquired from the MFP 150 in step S402. If a valid certificate update setting is present, the process proceeds to step S405; otherwise the process proceeds to step S406.

In step S405, the security monitoring module 207 acquires the risk of the certificate update setting based on the certificate update setting included in the setting information acquired from the MFP 150 in step S402 and the setting of the monitoring policy related to security acquired in step S400. The security monitoring module 207 is an example of a second verification unit and verifies whether a certificate is scheduled to be updated in a predetermined period based on the update setting information. As a method for acquiring the risk of a certificate update setting, the risk is determined, for example, by whether or not the certificate update setting has been made such that the certificate will be updated by the expiration of the validity period of the certificate. The risk determined here may be, for example, "certificate has been set to be updated before expiration of validity period", "certificate is not set to be updated before expiration of validity period", or the like. The security monitoring module 207 acquires risk by scoring security risk for each risk. Thus, the degree of risk (degree of danger) can be determined for each predetermined range value of a score, and a warning can be made.

In step S406, the security monitoring module 207 serves as the first verification unit and acquires the risk of the certificate validity period based on the certificate information acquired from the MFP 150 in step S401 and the setting of the monitoring policy related to security acquired in step S400. As a method of acquiring the risk of a certificate validity period, a comparison is made between the number of days until the validity period of a certificate expires and a threshold for warning of the certificate validity period included in the setting of a monitoring policy related to the certificate, which is included in the setting of a monitoring policy for security, for example. Furthermore, the risk is determined as "no problem," "low risk," "medium risk," and "high risk," in accordance with the result of the comparison. The risk is acquired by scoring the security risk for each risk.

In step S407, the security monitoring module 207 determines whether or not the overall security risk is "high risk" based on the score of the certificate update setting risk acquired in step S405 and the certificate validity period risk acquired in step S406. If the result of the determination is "high risk", the process proceeds to step S410; otherwise, the process proceeds to step S408. In step S408, the security monitoring module 207 determines whether or not the overall security risk of the certificate is "medium risk" based on the score of the certificate update setting risk acquired in step S405 and the certificate validity period risk acquired in step S406. If the result of the determination is "medium risk", the process proceeds to step S411; otherwise, the process proceeds to step S409. In step S409, the security monitoring module 207 determines whether or not the overall security risk of the certificate is "low risk" based on the score of the certificate update setting risk acquired in step S405 and the certificate validity period risk acquired in step S406. If the result of the determination is "low risk", the process proceeds to step S412; otherwise, the process proceeds to step S413. In each of steps S410, S411, S412, and S413, the reporting module 208 serves as a providing unit and creates a report visualizing the security risk of the certificate determined by the security monitoring module 207 and displays it in a UI.

<Setting Input Screen>

Next, an example of a screen for inputting settings for setting a monitoring policy related to security will be described with reference to FIG. 5. In FIG. 5, a reference numeral 500 is a portion for inputting settings of a monitoring policy related to certificate security, and items that can be set for monitoring the security of a certificate for any MFP 150 managed by the network device management application 202 are displayed.

A reference numeral 501 is a portion for inputting the usage destination of a key to be monitored, and it is possible to select a usage destination of which key to make a security monitoring target using a check box. For example, "no usage", "TLS", "IEEE802.1x", and "IPSec" can be selected. A reference numeral 502 is a portion for inputting a setting of a monitoring policy related to certificates and it can be selected whether to confirm the validity period of a certificate registered in a network device such as the MFP 150. It allows the threshold number of days to be inputted in a text box for at least how many days of validity period is remaining for the security risk to be determined as OK, low risk, medium risk, or high risk when confirming the validity period of a certificate. Each threshold number of days must be inputted with a numerical relationship of "OK">"low risk">"medium risk">"high risk", and it is desirable to display a pop-up or the like prompting to re-input a valid number when user input for which such a relationship cannot be maintained is received.

A reference numeral 503 is a portion for inputting a setting of a monitoring policy related to certificate update settings, and at least one monitoring item is displayed to be selectable. For example, it is possible to select whether or not to confirm whether a certificate update has been set such that expiration of the validity period of a certificate registered in the MFP 150 or the like does not occur. It is also possible to select whether or not to confirm whether the content information (subject information) of the certificate set in the certificate update setting matches the content information of the certificate registered in the current network device to be monitored. Incidentally, the monitoring items described here are an example, and may include other monitoring items.

A reference numeral 504 is a registration button and, when selected, the UI module 203 acquires the settings of the monitoring policy related to security set on the UI. The security monitoring module 207 updates the setting management table 303 related to security, the setting management table 304 related to certificates, and the setting management table 305 related to certificate update settings with the information acquired from the UI. A reference numeral 505 is a cancel button and, when clicked, cancels user input by discarding the settings of the monitoring policy related to security set on the UI.

<Warning Report>

Next, an example of a screen for displaying a security risk warning report that the reporting module 208 displays on a UI in steps S410, S411, S412, and S413 will be described with reference to FIG. 6. Although an example in which the reporting module 208 outputs a warning report on a display screen will be described here, there is no intention to limit the present invention. For example, data of a report indicating the content of a screen for displaying the report described below may be outputted as email, fax, or the like.

A reference numeral 600 is portion for displaying a security risk warning; when the "general" tab is selected, the overall security risk of the network is displayed, and when the "certificate" tab is selected, a certificate security risk warning display portion 601 specific to certificates is displayed. Although description will be omitted in the present embodiment for the method of displaying the overall security risk of a network device, the overall security risk may be displayed in a list, for example, for all of the network devices managed by the network device management application 202.

The reference numeral 601 is a portion for displaying a certificate security risk warning. The warning display portion 601 displays, in a graph, a ratio of the number of devices (statistical data) for each risk level of the security risk of the certificates determined by the security monitoring module 207 for all of the network devices managed by the network device management application 202. Although an example of displaying in a pie chart is indicated here, there is no intention to limit the present invention, and other display forms capable of displaying statistical data may be taken, such as displaying in a bar graph. Further, in these graphs, it is desirable that each risk level is displayed by a different display method, such as a different color and shading. Configuration may be taken such that higher risk is displayed with more emphasis.

A reference numeral 602 is a portion for displaying a list of devices and displays a list of all of the network devices managed by the network device management application 202. A certificate registered for each network device including the MFP 150 and the content of the certificate update setting are displayed, and the security risk determined by the security monitoring module 207 is displayed for each of the certificates. By selecting each device, various setting screens for the device, for example, the setting input screen 500, may be displayed. This allows the user to change the setting of a risky device from a report display screen or to manually set a certificate update. A reference numeral 603 is an OK button and, when clicked, ends the display of the security risk warning report screen.

As described above, the monitoring apparatus according to the present embodiment is capable of communicating with one or more network devices via a network and verifies the content information of a certificate related to security set in a network device to be monitored. The monitoring apparatus also verifies update setting information related to a certificate update and provides a report based on two verification results. Thus, the monitoring apparatus according to the present embodiment can verify not only the content of a certificate itself registered in a network device to be monitored but also whether or not a certificate update has appropriately been scheduled. Consequently, it is possible to provide verification result that is necessary and appropriate for guaranteeing the security of the MFP 150. As described above, by virtue of the present invention, it becomes possible to not only verify the content of a certificate registered in a network device but also appropriately provide a result of monitoring the security from many aspects in order to guarantee the security of the network device.

Second Embodiment

Hereinafter, a second embodiment of the present invention will be described. In the present embodiment, an example will be described in which when security risk is determined based on the content information of a certificate registered in a network device and the update setting information of the certificate, the security risk is determined in consideration of past certificate update results. Also described is an example of changing a registered certificate update setting to reduce risk in accordance with security risk when displaying different warnings in accordance with the security risk. Since the system configuration and hardware configuration of the network device management system including the network device of the present embodiment is the same the above first embodiment, description thereof will be omitted.

<Software Configuration>

Figure 7:
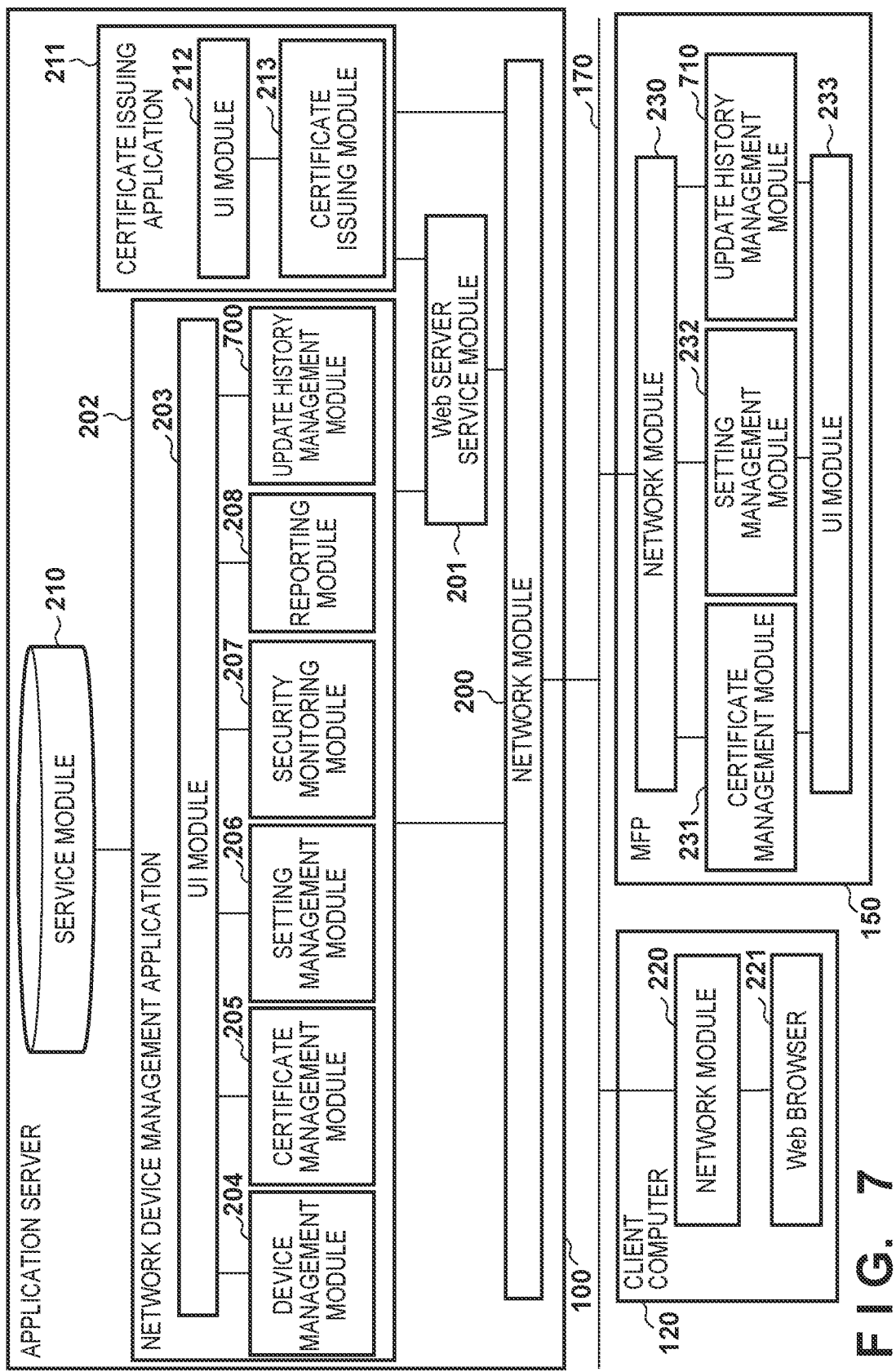
FIG. 7 is a diagram illustrating a software configuration according to an embodiment.

A software configuration of a network device management system including a management apparatus of the present embodiment will be described with reference to FIG. 7. Since the reference numerals 200 to 213 in the software configuration of the application server 100, the software configuration of the client computer 120, and the reference numerals 230 to 233 in the software configuration of the MFP 150 are the same as the above first embodiment, description thereof will be omitted.

In the software configuration of the application server 100, a reference numeral 700 is a certificate update history management module. The update history management module 700 acquires, via the network module 200, certificate update history information from a network device such as the MFP 150 connected to the application server 100 via the network 170. The update history management module 700 stores, for example, certificate update history information acquired from the MFP 150 in a certificate update history management table 800 of the service module 210 to be described later.

Meanwhile, in the software configuration of the MFP 150, a reference numeral 710 is a certificate update history management module and manages a certificate update history of the MFP 150. The certificate update history management module 710 also returns a certificate update history of the MFP 150 via the network module 230 in response to a request from the application server 100.

<Table Configuration>

Next, examples of table configurations in the service module 210 in the application server 100 will be described with reference to FIG. 8. Incidentally, the table configurations of FIG. 8 are merely an example and may be different table configurations from the present example. Since the reference numerals 300 to 305 are the same as FIGS. 3A-3F of the above first embodiment, description thereof will be omitted. A reference numeral 800 is a certificate update history management table and is a table for managing the certificate update history of the MFP 150. The information managed in the certificate update history management table 800 includes a history identifier, a device ID, a certificate update execution date/time, a certificate update execution result, and the like, for example. A history identifier is an identifier that uniquely identifies an update history of a certificate.

<Processing Flow>

Figure 9A:
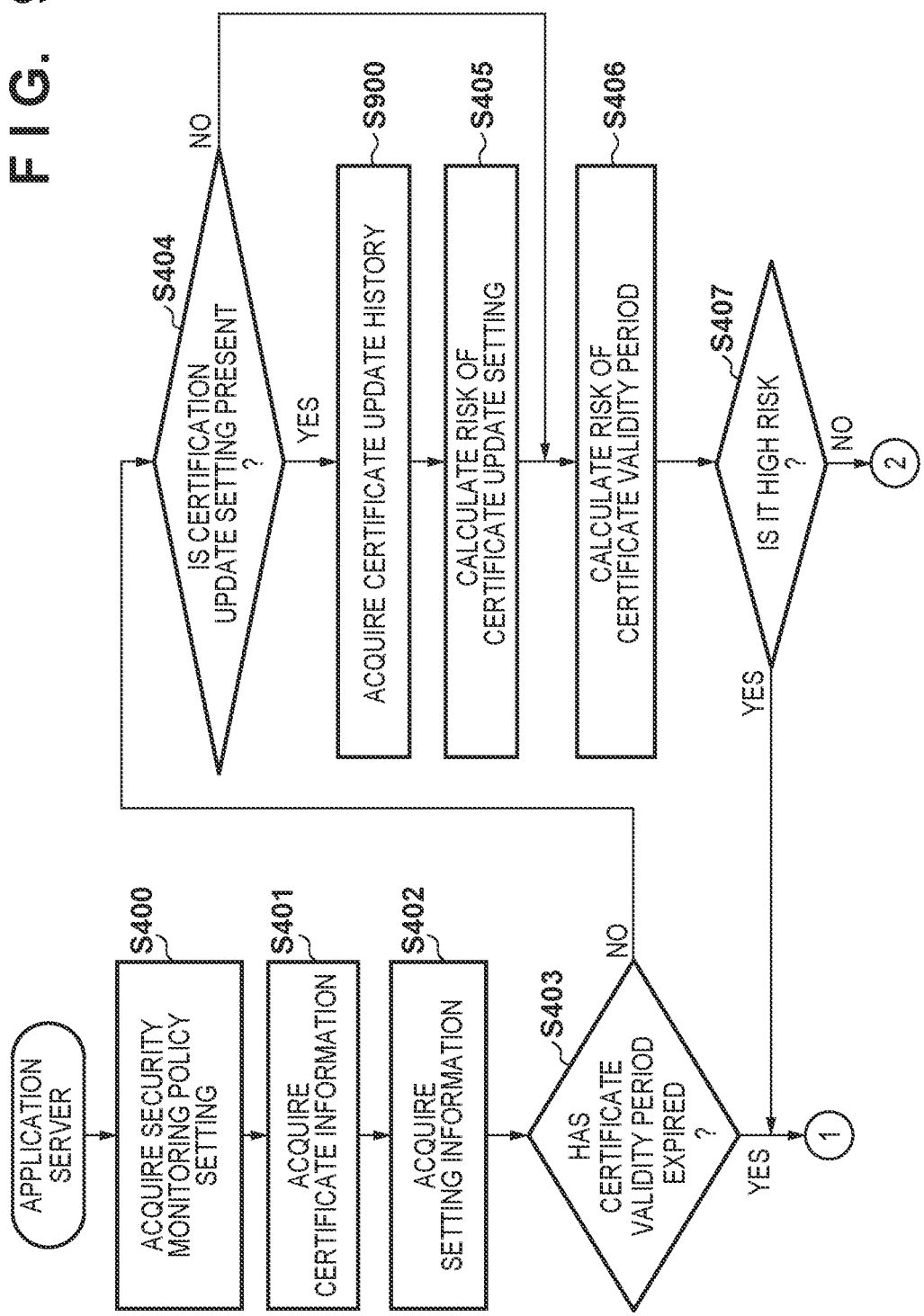

Next, a flow of processing of the application server 100 when the application server 100 according to the present embodiment monitors the security risk of the MFP 150 and gives a warning based on the monitoring result will be described with reference to FIGS. 9A and 9B. The processing described below is realized by, for example, the CPU 101 of the application server 100 reading a control program stored in a memory such as the ROM 103 into the RAM 102 and executing the control program. Incidentally, since steps S400 to S404 and S406 to S413 are the same as the processing in FIG. 4 of the above first embodiment, description thereof will be omitted.

In step S404, it is determined whether or not a valid certificate update setting is present in the setting information based on the setting information that the security monitoring module 207 has acquired from a network device (assumed to be the MFP 150 here) in step S402. If a valid certificate update setting is present, the process proceeds to step S900; otherwise the process proceeds to step S406. In step S900, the security monitoring module 207 acquires certificate update history information from the MFP 150 via the certificate update history management module 700. Then, in step S405, the security monitoring module 207 acquires the risk of the certificate update setting based on the certificate update setting included in the setting information acquired in step S402, the setting of the security monitoring policy acquired in step S400, and the certificate update history information acquired in step S900. As a method for acquiring the risk of a certificate update setting, if an error had occurred during the previous update of the certificate, for example, it is determined that there is risk, and the risk is acquired by scoring the risk. For example, if the previous update of the certificate had failed, the risk may be determined to be higher as the time interval between the date on which an execution of update of the certificate is scheduled and expiration of the validity period of the certificate decreases, so that even if the update also fails this time, it can be retried with time to spare.

In steps S410, S411 and S412, the reporting module 208 creates a report visualizing the security risk of the certificate determined by the security monitoring module 207 and then proceeds to step S901. In step S901, the security monitoring module 207 determines whether changing the certificate update setting can reduce security risk. As a method of determining whether or not security risk can be reduced, it may be determined whether or not the update date/time of the certificate update setting can be changed to be executed in advance by any number of days, for example. If it is determined that security risk can be reduced, the process proceed to step S902; otherwise, the process is ended as is. In step S902, the security monitoring module 207 overwrites and updates the certificate update setting of the MFP 150 via the setting management module 206. As a method of overwriting and updating the certificate update setting, the update date/time of the certificate update setting is changed so that it is executed in advance by any number of days, for example. In step S903, the reporting module 208 displays in a UI that the certificate update setting has been overwritten and updated.

As described above, the monitoring apparatus according to the present embodiment determines security risk based on the past update history of the certificate in addition to the content information and the update setting information of the certificate. This makes it possible to determine security risk in consideration of the result of past certificate updates in addition to the content information and the certificate update setting information of the certificate registered in the network device. It is also possible to change the registered certificate update setting to reduce security risk if the security risk is high.

<Variation>

The present invention is capable of various variations not limited to the above embodiments. In the above embodiments, an example has been described in which the application server 100, which is a monitoring apparatus, is provided outside the MFP 150, but a configuration may be taken such that a predetermined MFP on the network includes a monitoring apparatus. Alternatively, the monitoring function may be provided in each network device, and the monitoring result may be transmitted to a server such that a report summarizing the monitoring results of a plurality of network devices is outputted in the server. That is, the monitoring apparatus according to the present invention may be provided in any device on the network, and the monitoring function and the report (warning) function may be implemented by a plurality of devices cooperating.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-049150, filed Mar. 23, 2021, which is hereby incorporated by reference herein in its entirety.

What is claimed is:

1. A monitoring apparatus capable of communicating with one or more network devices via a network, the monitoring apparatus comprising:
   at least one memory device that stores a set of instructions; and
   at least one processor that executes the set of instructions to:
   verify content information of a certificate related to security set in a network device to be monitored from among the one or more network devices;
   verify update setting information indicating an update schedule of the certificate set by a user;
   determine a level of a security risk based on a certificate validity period in the content information of the certificate and the update setting information;

provide a report based on each verification result, wherein the report includes both the level of the security risk and information indicating whether the certificate will be automatically updated based on the update setting information such that an expiration of validity period does not occur;

monitor a plurality of network devices from among the one or more network devices;

acquire the content information of the certificate and the update setting information via the network from each of the plurality of network devices to be monitored;

manage the update setting information for each network device to be monitored, wherein the report includes statistical data that accords with the level of the security risk in the plurality of network devices to be monitored; and set, in accordance with a user input, a monitoring policy including a threshold number of days related to a validity period of a certificate registered in the plurality of network devices, and a monitoring item related to an update setting of a certificate, wherein the level of the security risk is determined based on the certificate validity period in the content information of the certificate, the update setting information and the set monitoring policy, and wherein the monitoring policy further includes a usage destination of a key to be monitored.

2. The monitoring apparatus according to claim 1, wherein the report includes different displays in accordance with the determined security risk.

3. The monitoring apparatus according to claim 1, wherein the at least one processor executes instructions in the memory device to: verify, based on an update history of the certificate, the content information of the certificate.

4. The monitoring apparatus according to claim 1, wherein the at least one processor executes instructions in the memory device to: change the update setting of a certificate related to the network device to be monitored from among the one or more network devices in accordance with a user input inputted via a display screen for displaying the report.

5. A method of controlling a monitoring apparatus capable of communicating with one or more network devices via a network, the method comprising:

verifying content information of a certificate related to security set in a network device to be monitored from among the one or more network devices;

verifying update setting information indicating an update schedule of the certificate set by a user;

determining a level of a security risk based on a certificate validity period in the content information of the certificate and the update setting information;

providing a report based on each verification result, wherein the report includes both the level of the security risk and information indicating whether the certificate will be automatically updated based on the update setting information such that an expiration of validity period does not occur;

monitoring a plurality of network devices from among the one or more network devices;

acquiring the content information of the certificate and the update setting information via the network from each of the plurality of network devices to be monitored;

managing the update setting information for each network device to be monitored, wherein the report includes statistical data that accords with the level of the security risk in the plurality of network devices to be monitored; and setting, in accordance with a user input, a monitoring policy including a threshold number of days related to a validity period of a certificate registered in the plurality of network devices, and a monitoring item related to an update setting of a certificate, wherein the level of the security risk is determined based on the certificate validity period in the content information of the certificate, the update setting information and the set monitoring policy, and wherein the monitoring policy further includes a usage destination of a key to be monitored.

6. A non-transitory computer-readable storage medium storing a program that causes a computer to execute a method of controlling a monitoring apparatus capable of communicating with one or more network devices via a network, the method comprising:

verifying content information of a certificate related to security set in a network device to be monitored via the network from among the one or more network devices;

verifying update setting information indicating an update schedule of the certificate set by a user;

determining a level of a security risk based on a certificate validity period in the content information of the certificate and the update setting information;

providing a report based on each verification result, wherein the report includes both the level of the security risk and information indicating whether the certificate will be automatically updated based on the update setting information such that an expiration of validity period does not occur;

monitoring a plurality of network devices from among the one or more network devices;

acquiring the content information of the certificate and the update setting information via the network from each of the plurality of network devices to be monitored;

managing the update setting information for each network device to be monitored, wherein the report includes statistical data that accords with the level of the security risk in the plurality of network devices to be monitored; and setting, in accordance with a user input, a monitoring policy including a threshold number of days related to a validity period of a certificate registered in the plurality of network devices, and a monitoring item related to an update setting of a certificate, wherein the level of the security risk is determined based on the certificate validity period in the content information of the certificate, the update setting information and the set monitoring policy, and wherein the monitoring policy further includes a usage destination of a key to be monitored.

7. An image processing apparatus, comprising:
the monitoring apparatus according to claim 1;
an image processing unit;
at least one memory device that stores a set of instructions; and
at least one processor that executes the set of instructions to:
request a certificate issuing server to issue a certificate and acquires the certificate.

8. The monitoring apparatus according to claim 1, wherein the report further includes a selectable selection for at least one of the one or more network devices, wherein at least one processor executes instructions in the memory device to:
   in response to a user selection of the selectable selection, display an input screen configured to allow the user to change a setting for levels of security risk.

9. The monitoring apparatus according to claim 8, wherein the input screen comprises, for each level of security risk, an input interface configured to allow the user to set a number of days of validity period corresponding to the respective level of security risk.

10. The monitoring apparatus according to claim 8, wherein the input screen further allows the user to change a setting to confirm whether the content information of the certificate set in the update setting information matches content information of the certificate registered in the network device to be monitored.

* * * * *